(12) United States Patent
Lacroix et al.

(10) Patent No.: US 10,202,868 B2
(45) Date of Patent: Feb. 12, 2019

(54) ATTACHMENT OF A DISCHARGE CONDUIT OF A TURBINE ENGINE

(71) Applicant: SNECMA, Paris (FR)

(72) Inventors: Florian Benjamin Kévin Lacroix, Moissy-Cramayel (FR); Frédéric Jacques Eugène Goupil, Etiolles (FR); Noël Joseph Camille Robin, Villejust (FR); Julien Vitra, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 681 days.

(21) Appl. No.: 14/692,994

(22) Filed: Apr. 22, 2015

(65) Prior Publication Data
US 2015/0308289 A1 Oct. 29, 2015

(30) Foreign Application Priority Data

Apr. 23, 2014 (FR) ..................................... 14 53657

(51) Int. Cl.
| | |
|---|---|
| *F04D 29/54* | (2006.01) |
| *F01D 25/24* | (2006.01) |
| *F01D 9/02* | (2006.01) |
| *F02C 9/18* | (2006.01) |
| *F02C 7/04* | (2006.01) |
| *F04D 29/64* | (2006.01) |

(52) U.S. Cl.
CPC ............... *F01D 25/24* (2013.01); *F01D 9/02* (2013.01); *F02C 7/04* (2013.01); *F02C 9/18* (2013.01); *F04D 29/545* (2013.01); *F04D 29/644* (2013.01)

(58) Field of Classification Search
None
See application file for complete search history.

(56) References Cited

U.S. PATENT DOCUMENTS

| 8,024,935 B2* | 9/2011 | Hoover | ................ F01D 17/105 60/226.1 |
|---|---|---|---|
| 2010/0104429 A1 | 4/2010 | Blanchard | |
| 2012/0260652 A1 | 10/2012 | Hiry | |
| 2015/0253781 A1* | 9/2015 | Ashton | ............... F24F 13/1426 454/256 |

FOREIGN PATENT DOCUMENTS

| DE | 10 2009 052 162 A1 | 5/2011 |
|---|---|---|
| EP | 1 854 989 A2 | 11/2007 |

(Continued)

OTHER PUBLICATIONS

Rapport de Recherche Préliminaire, dated Dec. 8, 2014, issued in corresponding French Application No. 1453657, filed Apr. 23, 2014, 2 pages.

*Primary Examiner* — David E Sosnowski
*Assistant Examiner* — Juan G Flores
(74) *Attorney, Agent, or Firm* — Christensen O'Connor Johnson Kindness PLLC

(57) ABSTRACT

A discharge conduit suitable for use with a turbine engine. The discharge conduit includes an air intake end, an air outlet end and a tubular duct for guiding air between the air intake and air outlet ends. The air intake end is equipped with attachment elements for attachment to an intermediate casing of the turbine engine. The attachment element can be of the resilient snap-in type.

10 Claims, 3 Drawing Sheets

(56) References Cited

FOREIGN PATENT DOCUMENTS

| EP | 2 650 520 | A2 |   | 10/2013 |   |
|----|-----------|----|---|---------|---|
| FR | 2 937 679 | A1 |   | 4/2010  |   |
| FR | 2 961 257 | A1 |   | 12/2011 |   |
| FR | 2961257   | A1 | * | 12/2011 | ........... F01D 17/105 |
| FR | 2 982 904 | A1 |   | 5/2013  |   |

* cited by examiner

ATTACHMENT OF A DISCHARGE CONDUIT OF A TURBINE ENGINE

TECHNICAL FIELD

Embodiments of the present disclosure relate to a discharge conduit for a turbine engine, and more particularly to the attachment of such a conduit.

BACKGROUND

A bypass turbine engine comprises a flow duct for a primary flow or hot flow and a flow duct for a secondary flow or cold flow. It is known to equip such a turbine engine with discharge valves, which are sometimes referred to as variable bleed valves (VBV).

Valves of this type are intended to regulate the air intake flow rate in the primary duct, in particular in order to limit the risk of a surge in the compressor of the turbine engine by making it possible to carry away or discharge an air flow in the secondary duct. In addition, if the primary duct is accidentally penetrated by water, in particular in the form of rain or hail, or various types of debris which are likely to adversely affect the operation of the turbine engine, these valves make it possible to collect this water or debris which is carried outwards by centrifugal force and is conveyed to the secondary duct.

As can be seen in FIG. 2 of the application FR-A1-2 982 904, a discharge conduit may be mounted downstream of each discharge valve so as to guide the air to the secondary duct of the turbine engine. This discharge conduit comprises an air intake end, an air outlet end and a tubular sleeve for guiding air between said ends.

The discharge conduits are part of an assembly of parts which is commonly referred to as a kit engine, further comprising two annular coaxial collars which define a portion of the flow duct for the secondary flow therebetween. The inner annular collar comprises openings which each communicate with the outlet end of a discharge conduit. The discharge conduit is attached by its outlet end to the inner collar, generally using a screw.

The assembly of parts (kit engine) is generally mounted directly downstream of an intermediate casing of the turbine engine. This intermediate casing is arranged between a low-pressure compressor and a high-pressure compressor, and comprises a radially outer part, which defines a portion of the flow duct for the secondary flow, and a radially inner part, which defines a portion of the flow duct for the primary flow. Between said radially inner and outer parts, the intermediate casing comprises a hub having an inner annular space, which is axially delimited by substantially radial annular walls which are upstream and downstream, respectively. The above-mentioned discharge valves are mounted in this annular space, and the air which passes through the valves from the flow duct for the primary flow passes through the openings in the downstream radial wall of the casing in order to then be conveyed to the flow duct for the secondary flow by the discharge conduits.

The downstream radial wall of the intermediate casing therefore comprises openings which each communicate with the intake end of a discharge conduit. Using current technology, the intake end of a discharge conduit is attached by screws to the intermediate casing.

However, this attachment technology cannot always be used. One of the functions of the assembly of parts (kit engine) is to allow access to equipment and to support systems in the engine compartment during maintenance operations, said equipment and support systems being positioned within the inner collar of said assembly and in particular immediately adjacent to the discharge conduits. It therefore needs to be possible to easily and rapidly dismount said discharge conduits. In certain turbine engines, owing to the equipment in the engine compartment and the shape of the discharge conduits, it is not possible to screw the conduits to the intermediate casing. This constraint is disadvantageous for assembly and maintenance of the engine since it is necessary to mount the conduits and the collars in the same operation. Since the environment is of a very restricted size and the number of operators is limited (especially during maintenance and owing to the size), the current solution is hardly conceivable for the service life of the engine.

Embodiments of the present disclosure propose a simple, effective and economical solution to this problem.

SUMMARY

Embodiments of the present disclosure propose a discharge conduit for a turbine engine, comprising an air intake end, an air outlet end and a tubular sleeve for guiding air between the ends, the air intake end being equipped with means for attachment to an intermediate casing of the turbine engine, characterized in that the attachment means are of the resilient snap-in type.

Embodiments of the present disclosure thus make it easier to mount the discharge conduit, it being possible for a single operator to produce the resilient snap-in attachment without a particular tool necessarily being required. The disclosure may thus also be adapted to turbine engines in which the environment around the discharge conduits is of a restricted size.

According to an embodiment of the disclosure, the attachment means are of the male type and are configured to be fitted into an opening in the intermediate casing and to cooperate by resiliently snapping onto the peripheral edge of this opening.

The air intake end in some embodiments comprises a tubular sleeve or duct which is attached to an end of said sleeve. The sleeve is preferably made of a single casting. The sleeve may be attached to the sleeve using any appropriate method, for example, by welding, brazing, screwing, riveting, etc. The sleeve is made of metal, for example.

In some embodiments, the sleeve comprises elastically deformable, resilient snap-in tabs.

The sleeve may define a substantially rectangular cross section. It may have four sides, on each of which a resilient snap-in tab is provided.

The resilient snap-in tabs are advantageously independent of one another.

In some embodiments, the resilient snap-in tabs each have a free end having a retaining lip. Each lip preferably has a section which has a rounded convex profile extending over an angle of at least 180°, and for example over more than 220°.

The present disclosure also relates to an assembly comprising a discharge conduit as described above, and an intermediate casing. The intermediate casing comprises a hub having a substantially radial annular wall which comprises at least one discharge air passage opening which is designed to cooperate with the means for attaching the conduit by resiliently snapping into the attachment means.

In some embodiments, the opening in the intermediate casing has a peripheral edge having a lead-in chamfer at the downstream end and a lead-out chamfer at the upstream end in order to make it easier to mount and dismount the conduit, respectively.

The present disclosure also relates to a turbine engine comprising a discharge conduit or an assembly as described above.

The present disclosure lastly relates to a method for mounting a discharge conduit as described above, characterized in that it comprises the steps of:

attaching the air intake end of the conduit to the intermediate casing by engaging the resilient snap-in means of the conduit in a corresponding opening in the casing such that the mounting conduit adopts a pre-mounting position; and attaching the air outlet end of the conduit such that the mounting conduit is in a final position which is different from the pre-mounting position, the movement of the conduit from its pre-mounting position into its final position being carried out by the conduit engaging further in the opening in the casing.

Advantageously, the movement of the conduit in the step of attaching the air outlet end of the conduit causes a peripheral seal to be compressed between the conduit and the casing.

Pre-mounting the discharge conduit makes it easier to mount, and this can be carried out by one person. In the pre-mounting position, the conduit can bear against the intermediate casing, which holds it in this position (in a cantilevered manner). The movement of the conduit from this pre-mounting position into a different position is particularly advantageous since it makes it possible to limit or even eliminate any direct contact between the conduit and the casing. It also allows the assembly of parts not to be over-stressed and prevents hyperstatic problems. The peripheral seal ensures that the conduit is sealed by limiting or even eliminating the air escaping in the region of its intake end.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
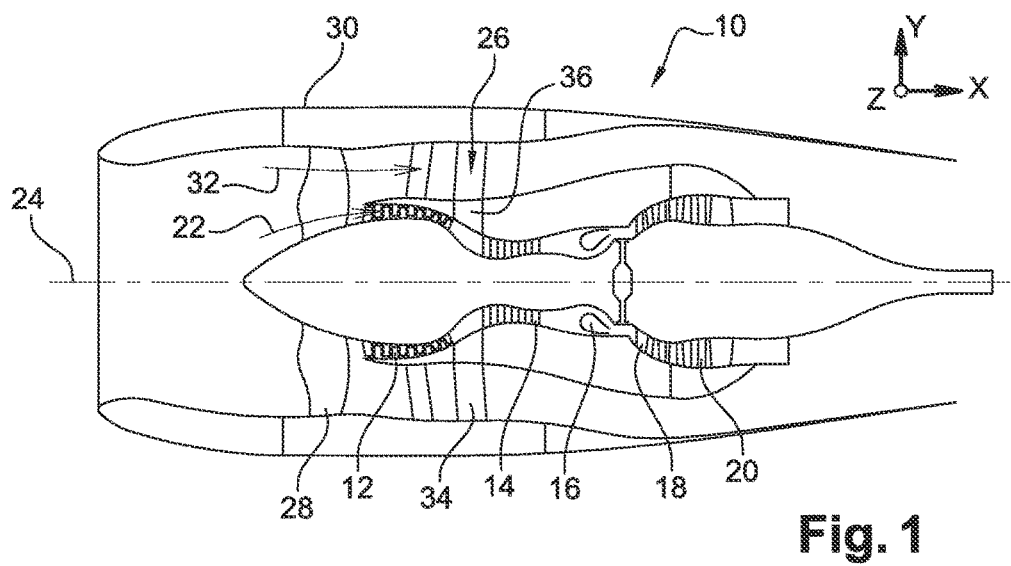
FIG. 1 is a schematic axial section through a bypass turbine engine.

As shown in FIG. 1, which is a schematic axial section through a bypass turbine engine 10, such a turbojet engine generally comprises, from upstream to downstream in the direction of flow of the gases, a low-pressure compressor 12, a high-pressure compressor 14, a combustion chamber 16, a high-pressure turbine 18 and a low-pressure turbine 20, which define a flow duct for a primary gas flow 22.

The high-pressure turbine 18 is rigidly connected to the high-pressure compressor 14 so as to form a high-pressure body, while the low-pressure turbine 20 is rigidly connected to the low-pressure compressor 12 so as to form a low-pressure body, such that each turbine drives the associated compressor in rotation about a turbojet-engine shaft 24 under the effect of the thrust of the gases coming from the combustion chamber 16.

An intermediate casing 26 is conventionally interposed between the low-pressure compressor 12 and the high-pressure compressor 14.

In the case of bypass turbojet engines which comprise a fan 28 which is ducted by a nacelle 30 in order to generate a secondary flow 32, the intermediate casing 26 generally comprises arms 34 which pass through the flow duct for this secondary flow 32.

Figure 2:
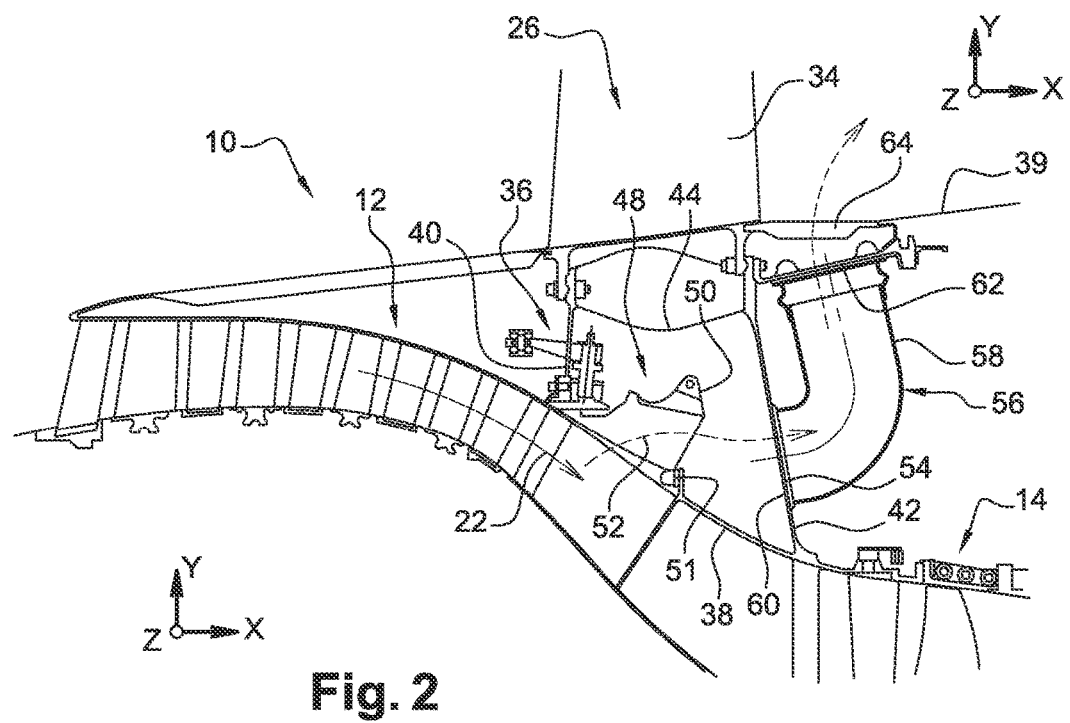
FIG. 2 is a schematic partial axial section on a larger scale through a turbine engine, and shows a discharge conduit according to the prior art.

FIG. 2 shows, on a larger scale, a hub 36 of the intermediate casing 26 of a known type of turbojet engine which is similar to that described above. This hub 36 comprises an inner collar 38 which delimits the flow space for the primary flow 22, an upstream radial wall 40 and a downstream radial wall 42 connected to the above-mentioned inner collar 38, as well as an outer collar 44 connecting said radial walls 40, 42.

The hub 36 supports arms 34 of the intermediate casing which are fixed to the radially outer ends of the radial walls 40 and 42. Moreover, this hub 36 is equipped with an annular row of discharge valves 48, one of which can be seen in cross section in FIG. 2. In this figure, the door 50 of the valve 48 more specifically can be seen, which is pivotally mounted about a shaft 51 so as to be movable between an opening position and a closing position of a corresponding opening formed in the inner collar 38 of the hub 36.

In order to control the discharge valves 48, the control mechanisms which are commonly used are either control ring mechanisms or torque cable mechanisms.

Opening each valve 48 causes an air flow (dashed arrow 52) to be discharged into the annular space delimited by the collars 38, 44 and the radial walls 40, 42.

The downstream radial wall 42 comprises an annular row of passage openings 54 for the discharge air flows 52 moving in the downstream direction. As can be seen in FIG. 2, discharge conduits 56 are mounted downstream of the intermediate casing 26 and are each intended to guide an air flow 52 brought about by opening a discharge valve 48, the air flow being guided from the outlet of the openings 54 to the flow duct for the secondary flow 32.

Each discharge conduit 56 comprises a tubular duct or sleeve 58 for guiding the air flow 52 between an upstream or intake end 60 which is attached to the downstream face of the downstream wall 42, such that this end is aligned with one of the openings 54, and a downstream or outlet end 62 which is attached to the intermediate casing 26.

In this case, the sleeve 58 of the conduit 56 has a shape which is curved by 90°, the upstream end thereof being oriented substantially axially in the upstream direction and the downstream end thereof being oriented substantially radially towards the outside relative to the axis 24 of the turbojet engine.

A fin grille 64 is mounted at the outlet of the conduit 56 and is attached at this point to an inner collar 39 (FIG. 2) which delimits the flow duct for the secondary flow 32 on the inside.

The discharge conduits 56 and the inner collar 39 are part of an assembly of parts referred to as a kit engine, which further comprises an outer collar (not shown) which extends around the inner collar and is connected thereto by substantially radial arms (not shown), there generally being two arms, which are at a 6 o'clock and 12 o'clock azimuth angle if the analogy of a clock face is used.

Using current technology, the intake end 60 of the discharge conduit 56 is attached by screws to the downstream radial wall 42 of the intermediate casing 26. Embodiments of the present disclosure propose an improvement to this technology which makes it possible to solve the above-mentioned problems. This improvement provides distinct advantages in terms of simplicity and speed of mounting (and dismounting) of a discharge conduit compared with the technology shown in FIG. 2.

Figure 3:
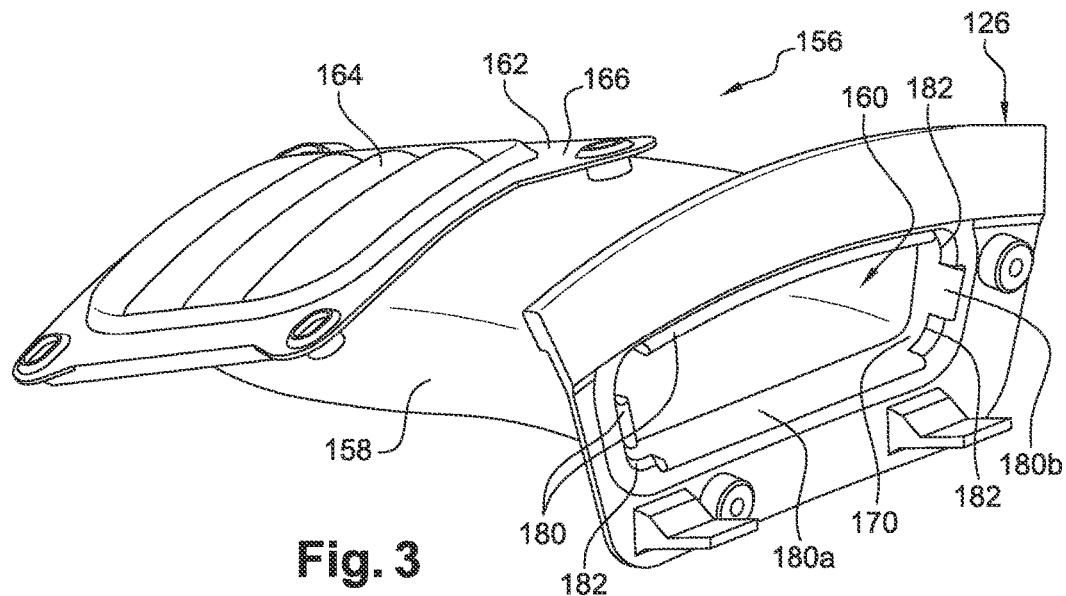
FIG. 3 is a schematic perspective side view of a discharge conduit according to the disclosure, viewed from upstream.
Figure 4:
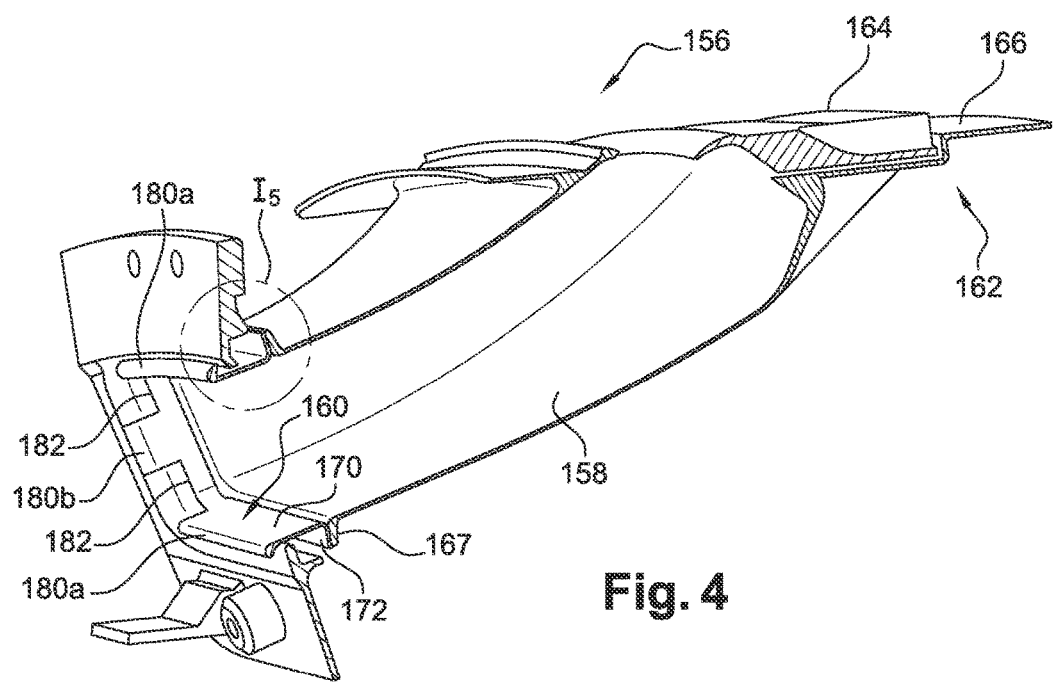
FIG. 4 is another schematic perspective longitudinal section through the discharge conduit from FIG. 3, viewed from upstream and from the side.
Figure 5:
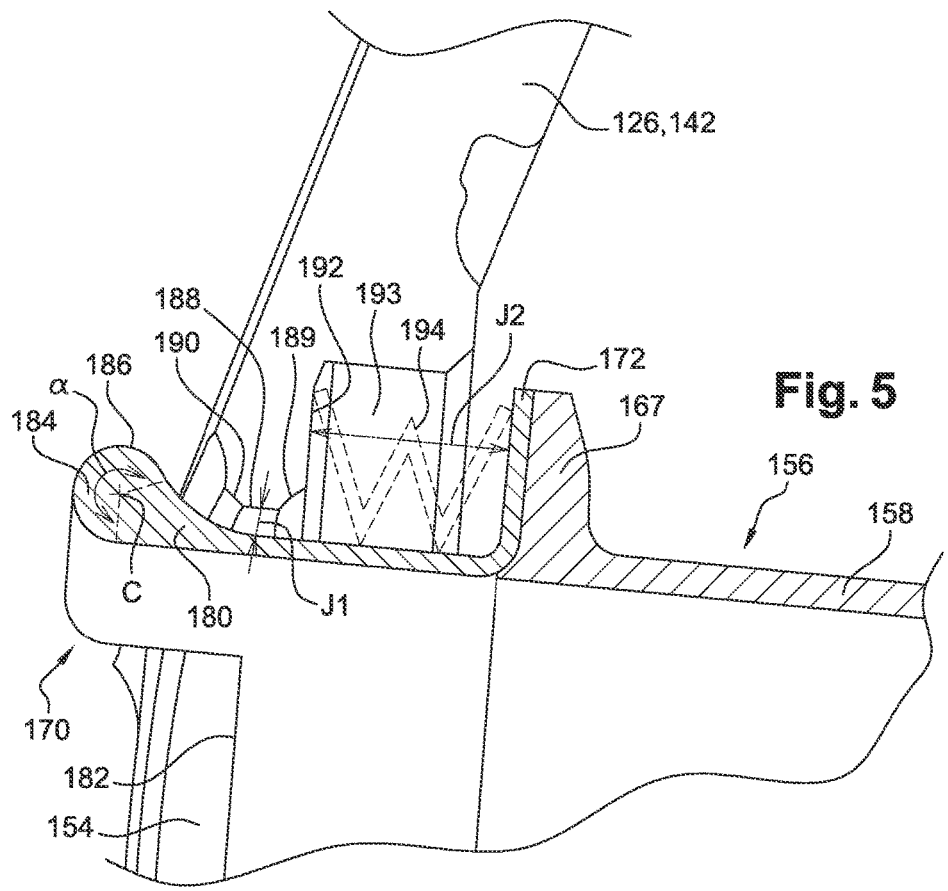
FIG. 5 is a view on a larger scale of the detail $I_5$ from FIG. 4, and shows resilient snap-in attachment means according to a first embodiment of the disclosure.

Reference is made hereinafter to FIGS. 3 to 5, which show a first embodiment of the discharge conduit 156 according to the disclosure. The conduit 156 essentially comprises three parts: a tubular duct or sleeve 158 for guiding a discharge air flow, a fin grille 164 which is attached to the downstream or outlet end 162 of the conduit 156, and a tubular sleeve 170 for snap-in attachment, which is attached to the upstream or intake end 160 of the conduit 156.

The sleeve 158 may be made of cast metal, for example titanium. The sleeve 158 has a substantially rectangular or square cross section of which the corners are rounded. The intake end 160 and outlet end 162 of the conduit 156 also have a generally rectangular or square shape.

At each of its ends, the sleeve 158 has an annular attachment flange 166, 167, which extends over the entire periphery of the corresponding end. The downstream flange 166 has through-openings for means, for example of the nut and bolt type, for attaching the grille 164 to pass through. This downstream flange 166 is furthermore designed to be applied to the radially inner face of an inner collar which is intended to delimit the flow duct for the secondary flow of the turbine engine on the inside, such as the inner collar provided with reference numeral 39 in FIG. 2. The downstream flange 166 comprises openings which are intended to be aligned with openings in said collar for attachment means of the nut and bolt type, for example, to pass through.

The upstream flange 167 is designed to be placed against a flange 172 provided at the upstream end of the sleeve 170. The flanges 167, 172 are attached to each other using any appropriate method, and for example by means of rivets. The upstream flange 167 thus comprises openings which are intended to be aligned with openings in the flange 172 for rivets to pass through.

The sleeve 170 has a cross-sectional shape which is similar to that of the sleeve 158, that is to say substantially rectangular or square, the corners of which are rounded. The sleeve 170 extends in the extension of the sleeve 158, in the upstream direction.

The sleeve 170 has, at its upstream end, that is to say at its end opposite its flange 172, resilient snap-in attachment means and in particular resilient snap-in means for fitting into an opening 154 in a downstream radial wall 142 of an intermediate casing 126. The sleeve 170 forms a male element which cooperates with the opening 154 in the casing 126, which forms a female element.

In the example shown, the sleeve 170 comprises, at its upstream end, elastically deformable, resilient snap-in tabs 180 which cooperate with the peripheral edge of the opening 154 in the casing 126.

There are four tabs 180 in this case, and these are independent of one another, thereby allowing them to deform independently of one another, in particular by flexing. In the example shown, this independence is produced by notches 182 at the upstream end of the sleeve 170. The four tabs 180 are located on each of the four sides of the upstream end of the sleeve 170, and are generally square or rectangular. The notches 182 located between the tabs 180 are therefore located in the region of the corners or angles at this end. This tab 180 has an elongate shape and extends over the majority of the length of the corresponding side. In the example shown, the sleeve 170 has two large tabs 180a which are located on the longer sides of the upstream end of the sleeve and two small tabs 180b which are located on the shorter sides of said upstream end.

One tab 180 can be seen more easily in FIG. 5. Each tab 180 extends in the upstream direction in the extension of the sleeve 170 and comprises, at its free upstream end, a lip 184 or a bead which extends on the outside of the sleeve. This lip 184 has a rounded convex cross-sectional shape or profile which extends over a relatively large angle.

C denotes a point which is substantially at the center of the profile of the lip 184. It will be noted in FIG. 5 that the rounded profile of the lip extends over an angle α of at least 180°, and, for example, over more than 220°. Owing to this profile, the lip 184 has a substantially cylindrical surface 186 over its outer periphery.

The sleeve 170 may be made of cast metal, for example, titanium.

The opening 154 in the intermediate casing 126 is shaped to receive the sleeve 170 of the conduit 156 according to the disclosure. The opening 154 thus has a similar shape to that of the sleeve 170 and has cross-sectional dimensions which are greater than those of the (central body of the) sleeve so as to allow said sleeve to engage in the opening 154. As can be seen in FIG. 5, play J1 may be provided between the peripheral edge 188 of the opening 154 and the body of the sleeve 170. As can also be seen in FIG. 5, the downstream flange 172 of the sleeve 170 defines cross-sectional dimensions which are greater than those of the opening 154 so as to stop the sleeve from completely passing through the opening when mounting the conduit 156. In addition, the lips 184 of the sleeve 170 define cross-sectional dimensions which are greater than those of the opening 154. Owing to their flexible nature, said lips make it possible to insert the sleeve 170 into the opening 154 by resiliently snapping in. They form retaining means which are capable of cooperating by bearing against the peripheral edge 188 of the opening 154 during mounting of the conduit 156.

To make it easier to mount the sleeve 170 in the opening 154 in the intermediate casing 126 by moving the conduit 156 from downstream to upstream and inserting the tabs 180 into the opening 154, the peripheral edge 188 of this opening 154 has a lead-in chamfer 189 at the downstream end, in this case over its entire periphery. In the same way, to make it easier to dismount the sleeve 170 from the opening 154 by moving the conduit 156 from upstream to downstream and removing the tabs 180 from the opening 154, the peripheral edge of this opening 154 has a lead-out chamfer 190 at the upstream end, in this case over its entire periphery. The lips 184 of the sleeve 170 are intended to cooperate with said chamfers 189, 190, which guide said lips during the deformation thereof.

As can be seen in FIG. 5, after inserting the sleeve 170 into the opening 154 in the intermediate casing 126, the flange 172 of the sleeve is opposite and at a distance J2 from a peripheral part 192 of the downstream wall 142 of the casing 126, extending around the opening 154. The flange 172 and this peripheral part 192 define therebetween a receiving portion 193 for mounting a peripheral seal, which is shown schematically by the dashed lines 194. This seal extends around the body of the sleeve 170 and is intended to be compressed between the flange 172 thereof and the peripheral part 192 of the casing, after the discharge conduit 156 has been definitively attached, but is not necessarily intended to be compressed after the sleeve 170 has been inserted into the opening 154 and before the discharge conduit 156 has been definitively attached, as will be explained in greater detail in the following.

The discharge conduit 156 according to the disclosure is advantageously mounted using the method described below.

The conduit 156 is shown downstream of the intermediate casing 126 such that the sleeve 170 thereof is substantially aligned with an opening 154 in the casing 126 in which said sleeve is intended to be mounted. The conduit 156 is moved from this position, in the upstream direction, into a pre-mounting position in which the sleeve 170 is inserted into the opening 154 and the lips 184 of the tabs 180 thereof are located upstream of the wall 142 of the casing 126. In order to reach this pre-mounting position, the tabs 180 are elastically deformed and the deformation thereof is guided by the lips 184 thereof cooperating with the lead-in chamfer 189 of the opening 154. The tabs 180 are deformed by flexing towards the inside of the sleeve 170. In its pre-mounting position, the conduit is attached in a cantilevered manner to the intermediate casing 126. At least some of the lips 184 of the sleeve 170 bear against the peripheral edge 188 of the opening 154 in order to hold the conduit 156 in this position. This bearing may be achieved owing to the presence of the seal 194, which may urge the sleeve 170 in the downstream direction if it is pre-stressed into this pre-mounting position.

In order to definitively attach the conduit, the outlet end thereof can be attached by means of screws to the inner collar (provided with reference numeral 39 in FIG. 2) of the kit engine. This collar is preferably divided into sectors, and each collar sector may comprise one or two outlet openings for discharge air and therefore may be connected to one or two discharge conduits 156 according to the disclosure. In its final or definitive mounting position, the conduit 156 is moved forwards in the upstream direction relative to its pre-mounting position. It is, for example, in the position shown in FIG. 5, in which the lips 184 of the sleeve are positioned upstream and at a distance from the peripheral edge 188 of the opening 154 of the casing 126. Owing to this distance and the above-mentioned play J1, any direct contact between the sleeve 170 and the casing 126 can be prevented, which is advantageous. The seal 194 is compressed when the conduit 156 is moved into its definitive position and ensures air tightness between the sleeve 170 and the casing 126.

The discharge conduit 156 according to the disclosure is dismounted by repeating the above-mentioned steps in reverse order. This dismounting includes moving the conduit 156 from its definitive mounting position into its pre-mounting position. In order to reach this pre-mounting position, the tabs 180 are elastically deformed and the deformation thereof is guided by the lips 184 thereof cooperating with the lead-out chamfer 189 of the opening 154.

Figure 6:
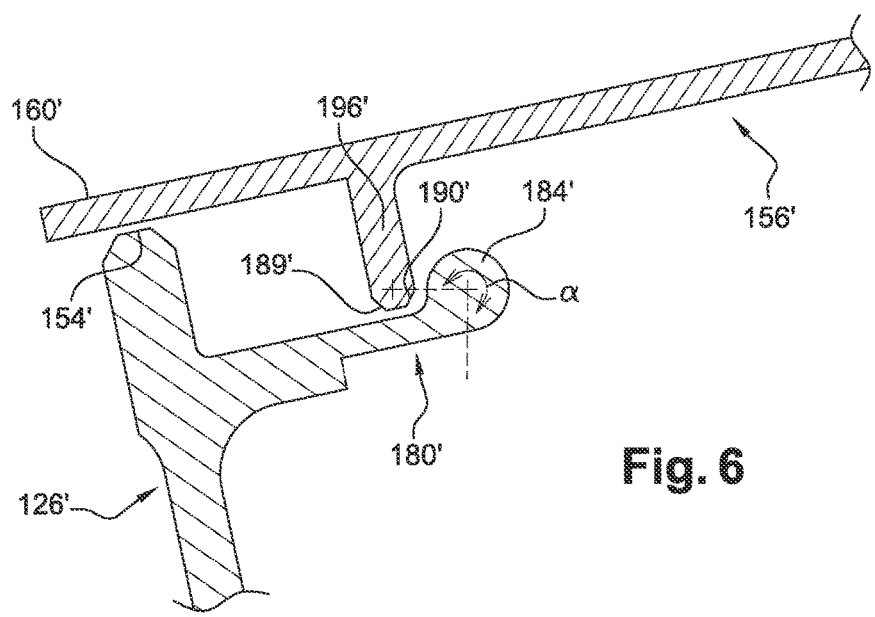
FIG. 6 is a view which corresponds substantially to that in FIG. 5 and shows resilient snap-in attachment means according to a variant of the disclosure.

FIG. 6 shows a variant of the disclosure which differs from the embodiment described above essentially by two points.

The first point relates to the elastically deformable tabs 180', which in this case are located on the intermediate casing 126' and cooperate with a peripheral rim 196' of the conduit 156'.

The second point relates to the conduit 156' itself, which does not have a sleeve attached. The intake end 160' of the conduit 156' is engaged in the opening 154' in the casing 126' by resiliently snapping in, the peripheral rim 196' cooperating with the resilient tabs 180' in order to deform them during mounting of the conduit 156', in this case by flexing outwards.

As is the case for the peripheral edge 188' in the previous embodiment, the free peripheral edge of the rim 196' is provided with an upstream lead-in chamfer 189' and a downstream lead-out chamfer 190' which are intended to cooperate with the resilient tabs 180'. Each tab 180' is similar to those denoted 180 in the above and comprises a lip 184' having a rounded convex profile which extends over an angle $\alpha$ of at least 180° and for example over more than 220°. The tabs 180' extend in the downstream direction from the downstream radial wall 142 of the casing 126' and are uniformly distributed around the opening 154', for example in the same manner as those in FIGS. 3 to 5.

The steps for mounting and dismounting the conduit 156' are similar to those described above.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A discharge conduit for a turbine engine, comprising:
   an air intake end;
   an air outlet end; and
   a tubular duct configured for guiding air between said ends,
   wherein said air intake end being configured for attachment to an intermediate casing of the turbine engine,
   wherein said air intake end comprises a tubular sleeve which is attached to an end of said tubular duct, said tubular sleeve comprising elastically deformable, resilient snap-in tabs, and
   wherein the resilient snap-in tabs each have a free end having a retaining lip, each lip having a section which has a rounded convex profile extending over an angle of at least 180°.

2. The discharge conduit according to claim 1, wherein the resilient snap-in tabs are designed to be fitted into an opening in the intermediate casing and to cooperate by resiliently snapping onto a peripheral edge of said opening.

3. The discharge conduit according to claim 1, wherein the tubular sleeve defines a substantially rectangular cross section and has four sides, on each of which a resilient snap-in tab is provided.

4. The discharge conduit according to claim 1, wherein said resilient snap-in tabs are independent of one another.

5. The discharge conduit according to claim 1 wherein said angle is greater than 220°.

6. An assembly comprising;
a discharge conduit according to claim 1; and
an intermediate casing, the intermediate casing comprising a hub having a substantially radial annular wall which comprises at least one discharge air passage opening which is designed to cooperate with said resilient snap-in tabs for attaching the conduit by resiliently snapping into said opening.

7. A turbine engine comprising:
an assembly that includes a discharge conduit according to claim 1 and an intermediate casing, the intermediate casing comprising a hub having a substantially radial annular wall which comprises at least one discharge air passage opening which is designed to cooperate with said resilient snap-in tabs for attachment of the conduit by resiliently snapping into said opening.

8. An assembly comprising:
a discharge conduit comprising an air intake end, an air outlet end, and a tubular duct configured for guiding air between said ends, wherein said air intake end being equipped with attachment elements for attachment to an intermediate casing of the turbine engine, said attachment elements are of the resilient snap-in type; and
an intermediate casing, the intermediate casing comprising a hub having a substantially radial annular wall which comprises at least one discharge air passage opening which is designed to cooperate with said attachment elements for attaching the conduit by resiliently snapping into said opening,
wherein said opening in the intermediate casing has a peripheral edge having a lead-in chamfer at the downstream end and a lead-out chamfer at the upstream end in order to make it easier to mount and dismount the conduit respectively.

9. A method for mounting a discharge conduit according to claim 1, the method comprising the steps of:
attaching the air intake end of the discharge conduit to the intermediate casing by engaging the resilient snap-in elements of the discharge conduit in a corresponding opening in the intermediate casing such that the discharge conduit adopts a pre-mounting position, and
attaching the air outlet end of the discharge conduit such that the discharge conduit is in a final position which is different from the pre-mounting position, the movement of the discharge conduit from its pre-mounting position into its final position being carried out by the discharge conduit engaging further in the opening in the casing.

10. The method according to claim 9, wherein the movement of the discharge conduit in the step of attaching the air outlet end of the discharge conduit causes a peripheral seal to be compressed between the discharge conduit and the casing.

* * * * *